Dec. 7, 1937.     G. H. DOWTY     2,101,611
LOCKING MEANS FOR RETRACTABLE AIRCRAFT LANDING GEAR
Filed June 22, 1937     2 Sheets-Sheet 2

Inventor
George H. Dowty
By
Atty.

Patented Dec. 7, 1937

2,101,611

UNITED STATES PATENT OFFICE 2,101,611

LOCKING MEANS FOR RETRACTABLE AIRCRAFT LANDING GEAR

George Herbert Dowty, Cheltenham, England

Application June 22, 1937, Serial No. 149,770
In Great Britain March 12, 1936

8 Claims. (Cl. 244—102)

This invention relates to locking means for retractable aircraft undercarriages and has for an object to provide means which may prevent, or minimize the risk of, collapse of an undercarriage whilst an aeroplane is on the ground or partially or wholly ground-borne.

It has been found that with certain retraction undercarriages and the aircraft standing on the ground, collapse has resulted either because of some mistaken or mischievous operation, or by failure. The invention seeks to obviate such accidents. At the same time the invention may be employed for the purpose of cutting off any electrical indication used in connection with the undercarriage whereby consumption of current may be avoided, and possibly circuits not properly designed to be kept alive for prolonged periods, may be opened.

The invention may be better understood by reference to the two preferred embodiments of it given by way of example and shown in the accompanying drawings:—

Figure 1:
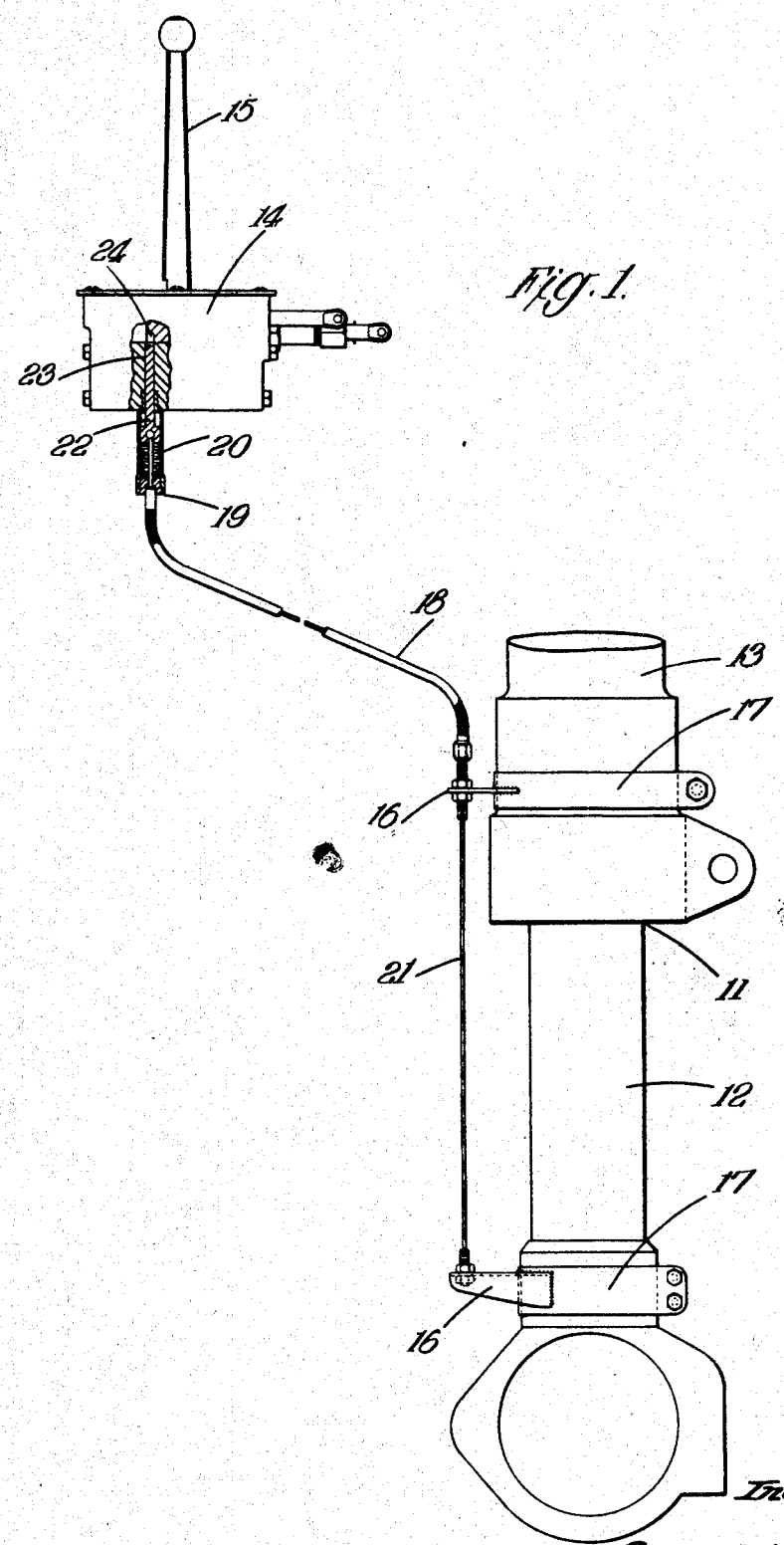
Figure 2:
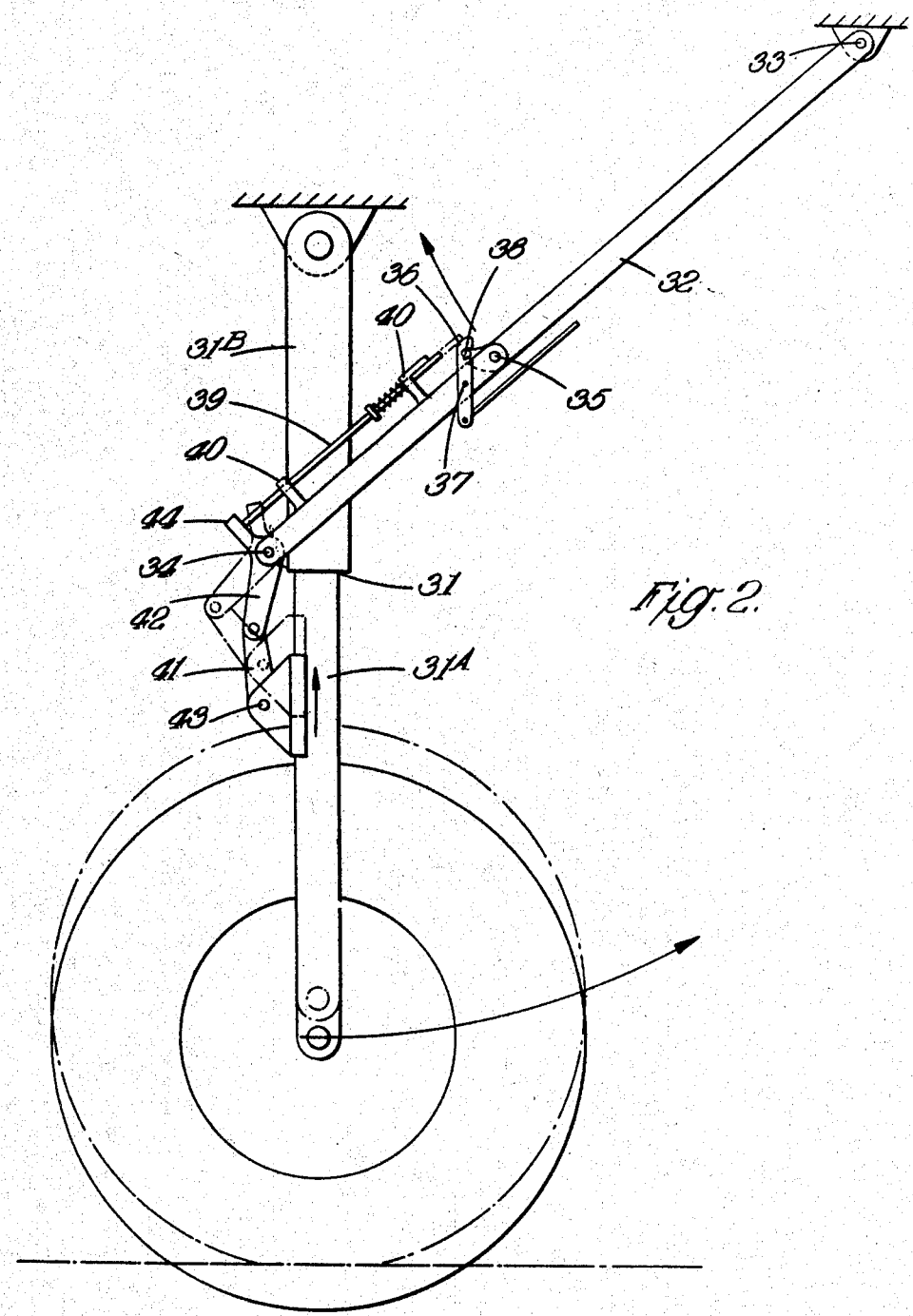

Figure 1 shows in part sectional side elevation an arrangement in which locking means serve to render inoperative a control for the undercarriage; and Figure 2 shows in side elevation an arrangement in which locking means operate on the undercarriage structure itself.

As shown in Figure 1, a shock absorbing resilient retractable leg, indicated generally at 11, of an aircraft undercarriage has the lower or sprung part 12, which carries the running wheel, mounted to telescope against resilient means (not shown) into the upper or unsprung part 13 of said leg 11.

It is well known that undercarriages may be retracted hydraulically, and there is shown at 14 control means for bringing about the desired retractive movements of the undercarriage, the hand lever 15 serving to control a distributor valve or operate a pump (not shown). The lower and upper parts 12 and 13 of the leg 11 carry horizontal lugs 16 which are secured to the corresponding part of the leg by means of clamping rings 17. The lug 16 on the upper part 13 of the leg serves as an abutment for one end of the outer casing 18 of a remote control mechanism, the other end of which casing abuts against a cap 19 at the end of a tubular fitting 20 secured to the underside of the control means 14. The lug 16 on the lower part 12 of the leg 11 serves as an anchorage for a cable 21 of the remote control mechanism, the other end of the cable having secured thereto a locking plunger 22 which is slidable within a bore 23 in the control means 14. The control lever 15 is formed with a recess 24, which when the control lever 15 is in a neutral position is in line with the bore 23 so that movement of the locking plunger 22 causes said plunger to enter the recess 24 to prevent operative movement of the control lever 15. Such movement of the locking plunger 23 is brought about by movement of the lower part 12 of the leg 11 into the upper part 13 of said leg, which latter movement is brought about by the weight of the aircraft when it is wholly or partially ground-borne.

It will be seen that whenever the aircraft to which the above means are fitted is on the ground, it will not be possible for anyone to retract the undercarriage.

In the arrangement shown in Figure 2, the resilient telescopic leg 31 is held in the extended position shown by means of a folding strut 32 which is pivoted at one end at 33 to a fixed part of the aircraft, and at the other end at 34 to a lug on the unsprung or upper part 31B of the leg 31. When the undercarriage is retracted the strut 32 folds about the pivots 33 and 34 and about the pivot 35 intermediately of the length of said strut 32. In such an arrangement the folding strut 32 is maintained in the position shown by means of a trigger member 36 pivoted at 37 to one part of the strut 32, the trigger member engaging with a pin 38 carried by a lug on the other part of said strut 32. The locking means comprises a slidable rod 39 guided in lugs 40 on that part of the strut 32 to which the trigger member is pivoted, the toggle members 41 and 42, the member 42 of which is in the form of a bell-crank lever. The toggle member 41 is pivoted at 43 to a lug on the sprung part 31A of the leg 31, and the other member 42 is pivoted at 34, independently of the strut 32, to the unsprung part 31B of the leg 31, whilst the free end 44 of the bell-crank lever 42 abuts against the slidable rod 39, which latter is spring-influenced to remain in contact with the bell-crank lever. In the position shown in full lines, which is the position it occupies when the aircraft is air-borne, the rod 39 is free from the trigger member 36, which latter is thus permitted to be rocked about its pivot 37 to clear the pin 38 and permit the undercarriage to be retracted. The various parts occupy the position shown in broken lines when the aircraft is ground-borne, the leg 31 having been contracted with consequent rocking movement of the toggle members 41 and 42 about their pivots 43 and 34, respectively. The rocking movement of the bell-crank lever 42 causes the rod 39 to slide so that said rod 39 passes over the end of the trigger member 36 preventing it from being rocked clear of the pin 38 and thus preventing retraction of the undercarriage.

A rod, such as that 39 of Figure 2, may abut at its end against the trigger member. In such a case the possibility of yielding in compression should be provided in the rod when the leg is under landing load compression greater than a normal static load. For example, the rod may be formed in sections capable of telescoping against strong compression springs.

It will be appreciated that a resilient tail wheel mounting may serve to operate locking means in accordance with the invention to bring about the desired locking of the undercarriage when the aircraft is on the ground.

If desired, the relative movement of the two parts of a resilient telescopic leg of an undercarriage may be utilized to open the electrical circuit of an indicator which when the aircraft is flying indicates the position of the retractable undercarriage, such opening of the circuit serving to prevent premature running down of the batteries.

What I claim is:—

1. In an aircraft undercarriage, retracting means for moving the undercarriage from an operative to an inoperative position, such undercarriage including yieldable shock-absorbing means under ground load, locking means to prevent operation of the retracting means, and means operated by the ground load shock absorbing movement of the undercarriage to actuate the locking means.

2. In an aircraft undercarriage, retracting means for moving the undercarriage from an operative to an inoperative position, such undercarriage including shock-absorbing means yieldable under ground load, a member for controlling the retracting means, means for locking the member against movement to prevent operation of the retracting means, and a connection between the locking means and the undercarriage to move the locking means into locking cooperation with the member under ground load yielding of the shock-absorbing means of the undercarriage.

3. In an aircraft undercarriage, retracting means for moving the undercarriage from an operative to an inoperative position, a member for controlling the retracting means, shock-absorbing means for the undercarriage yieldable under ground load, locking means to engage said member and hold the same against control movement of the retracting means, and a rod-like member connected at one end to that part of the undercarriage yieldable under ground load in the shock-absorbing function, the opposite end of the rod-like member being connected to the locking means whereby ground load yielding movement of the particular part of the undercarriage operates the rod-like member to move the locking means into locking cooperation with the control member for the retracting means.

4. In an aircraft undercarriage, retracting means for moving the undercarriage from an operative to an inoperative position, a resilient telescopic leg forming part of the undercarriage structure and yielding under ground load, locking means for preventing operation of the retracting means, and a connection between said telescopic leg and said locking means to cause operative movement of the locking means incident to that movement of the telescopic leg resulting from ground load.

5. An aircraft undercarriage comprising retracting means for moving the undercarriage from an operative to an inoperative position, shock-absorbing means in the undercarriage permitting relative movement of a ground-engaging part of such undercarriage under ground load, a locking means serving when in operative position to lock the retracting means against retractive movement, and a connection operated by the element of the undercarriage movable under ground load to operate the locking means to maintain a locked relation of the retracting means.

6. An undercarriage for aircraft comprising shock-absorbing means including an element relatively movable under ground load, means for retracting the undercarriage from an operative to an inoperative position, a locking element operative to lock the retracting means against retracting movement, and a member associated in the ground load movement of the movable element of the undercarriage to hold the locking means in locking position.

7. An undercarriage for aircraft including a foldable strut for retracting the undercarriage from an operative to an inoperative position, a trigger member to interlock the parts of said strut against folding, the undercarriage including a member movable under ground load, and a rod connected to move with said member and provide when moved an abutment to prevent release of the trigger member.

8. An aircraft undercarriage including a part relatively movable under ground load, a foldable strut providing means for retracting the undercarriage from an operative to an inoperative position, a trigger movable to lock the parts of the strut against relative movement to thereby prevent retractive movement of the undercarriage, a rod normally free of the trigger and movable to a trigger-locking position to prevent release movement of the trigger, and a toggle lever controlling the rod and connected to and operated by the movable member of the undercarriage to move the rod in the ground load operation of the movable member into locking cooperation with the trigger.

GEORGE HERBERT DOWTY.